July 19, 1960  W. B. DEIBLE ET AL  2,945,325
RECIRCULATING FURNACE
Filed May 7, 1957  5 Sheets-Sheet 1

INVENTORS.
William B. Deible
Harold A. Youkers
BY Green, McCallister & Miller
THEIR ATTORNEYS July 19, 1960 W. B. DEIBLE ET AL 2,945,325
RECIRCULATING FURNACE
Filed May 7, 1957 5 Sheets-Sheet 3

INVENTORS.
William B. Deible
Harold A. Youkers
BY
Green, McCallister & Miller
THEIR ATTORNEYS

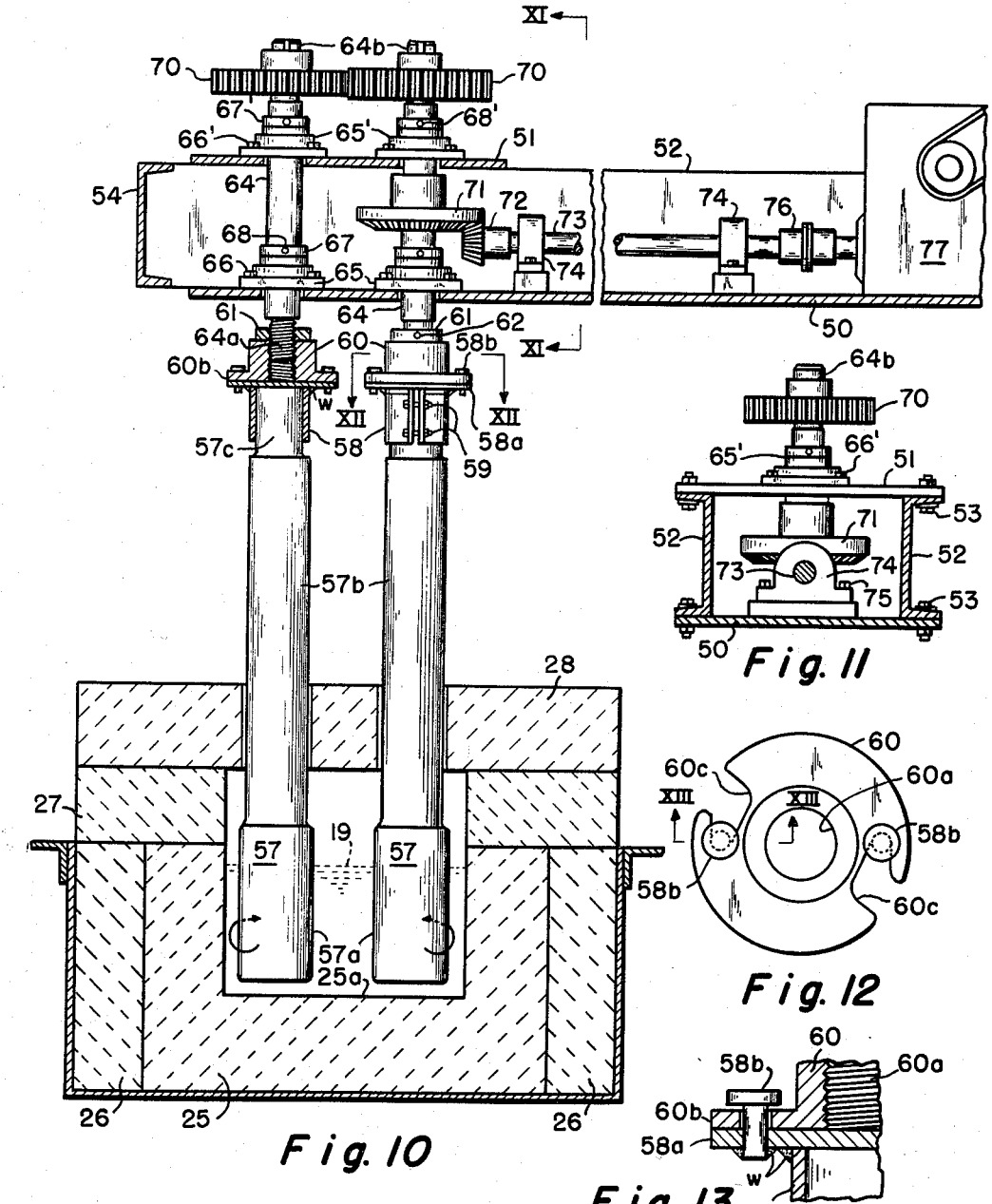

July 19, 1960

W. B. DEIBLE ET AL 2,945,325

RECIRCULATING FURNACE

Filed May 7, 1957

INVENTORS.
William B. Deible
Harold A. Youkers
BY
Green, McCallister & Miller

THEIR ATTORNEYS

United States Patent Office 2,945,325
Patented July 19, 1960

2,945,325

RECIRCULATING FURNACE

William B. Deible, Knox, and Harold A. Youkers, Oil City, Pa., assignors to Knox Glass, Inc., Knox, Pa., a corporation of Pennsylvania Filed May 7, 1957, Ser. No. 657,516

2 Claims. (Cl. 49—54)

This invention relates generally to the conditioning of molten material in a furnace preliminary to forming or shaping it at an elevated temperature. It deals with the problem of providing a better heat utilization and a better control of the runout in a furnace in preparing and delivering a suitable material, such as a vitreous or plastic material, so that it may be formed or shaped into suitable articles.

A phase of our invention relates to the melting and to the conditioning of materials in a molten state, to controlling their delivered condition, and to providing a better uniformity of molten batch. It has particular application to the handling or processing, and to the temperature conditioning of materials employed in making suitable articles, such as glass products. It also deals with an improved melting and refining or holding refractory furnace construction for processing the materials.

In the glass industry, there are two general types of furnaces employed. One type is the regenerative furnace which has a relative fuel utilization efficiency of only about 15%. The second or so-called unit melter is unsuitable for better grade glass (is more or less limited to low-melting point or lime glass) and produces a relatively poor grade of molten material.

It has been an object of our invention to provide a new and improved processing of material that is being temperature conditioned in a refractory furnace;

Another object has been to provide an improved furnace construction and utilization;

Another object has been to devise a furnace construction that will have a better flexibility of utilization, that will have a more efficient fuel utilization than existing types, and that will produce a better quality of conditioned material for a given desired tonnage;

A further object of our invention has been to provide an improved furnace construction of reasonable initial cost and cost of operation, that may be adapted for utilization with, for example, a regenerative furnace to increase its efficiency, and that has a better relationship of quality and rate of pull-out to heat utilization;

A still further object of our invention has been to devise a melting furnace which will successfully employ a mechanically-induced convection action between hot and cold portions of the batch;

These and many other objects of our invention will appear to those skilled in the art from the embodiments hereinafter shown and described.

In the drawings:

Figure 10 is a greatly enlarged transverse sectional detail taken along the line X—X of Figure 1 and showing the means of Figure 5 in greater detail;

Figure 11 is a side section in elevation on the scale of and taken along the line XI—XI of Figure 10;

Figure 12 is a still further enlarged horizontal sectional detail taken along the line XII—XII of Figure 10;

Figure 13 is a sectional detail of the structure of Figure 12 on the same scale as such figure and taken along the line XIII—XIII of such figure;

Figure 16:
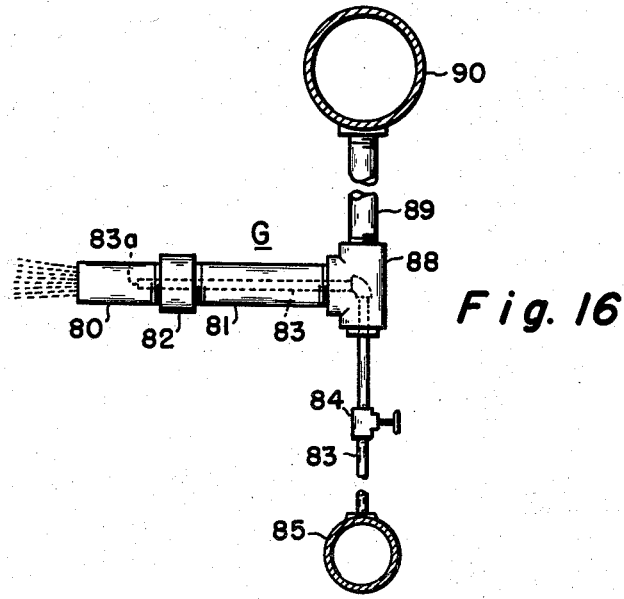

And, Figure 16 is an enlarged fragmental view showing a suitable form of burner arrangement for heating a furnace of our construction.

In considering our invention, it may be noted that where, for example, a batch of plastic or vitreous material has an effective melting temperature of about 2700 to 2800° F., that there may ordinarily be a gradient of about 400° vertically between top and bottom portions of the melt in the furnace. There is also a tendency for hotter and more fluid molten material to flow over a bridge wall between melting and refining portions of a furnace if the material is pulled too hard. There is also quite a problem involved in providing a homogeneous, substantially uniformly and well conditioned batch of molten material that is devoid of small floating islands of scum and still-solid material, and that will not require a maximum pull to avoid excessive heat loss, or in other words, a sacrifice of quality to provide a practical efficiency from the standpoint of heat utilization.

We have been able to provide substantially double the efficiency of an ordinary regenerative furnace which is far superior in efficiency to the unit melter. We provide a more economical installation from the standpoint of original cost and maintenance and one which may be effectively employed for, for example, units ranging from about 20 to 60 tons capacity.

Our invention is very adaptable, in that it can be used with a regenerative furnace, may be used in multiple as the need may arise (see Figure 14), and will provide important fuel savings for the same amount of fuel as compared to other furnaces.

Briefly, our invention deals with means for moving or returning a portion of the hot molten or fluid material from one chamber back to another chamber of the furnace to provide an improved and novel type of convection flow of the material wherein only a portion, for example, a third of the outflow from one chamber into another may continue on for delivery or pull-out, while the other or major portion, for example two thirds, may be returned to the conditioning or melting chamber; relative rate or speed of flow is the level-maintaining factor. Any suitable multiple arrangement employing such a principle may be utilized, depending upon the requirements as to draw-out, quality of the material, etc.

Figure 14:
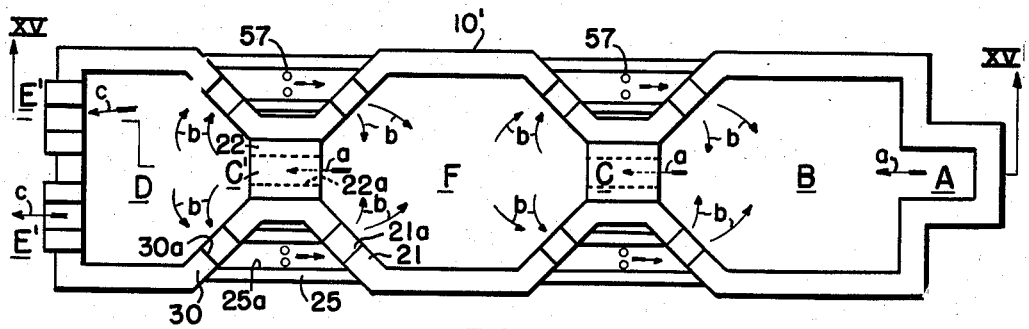
Figure 14 is a view similar to Figure 6, but on a reduced scale showing a modified type of furnace construction employing three chambers and two recirculator units, each of the latter comprising a pair of recirculators.
Figure 15:
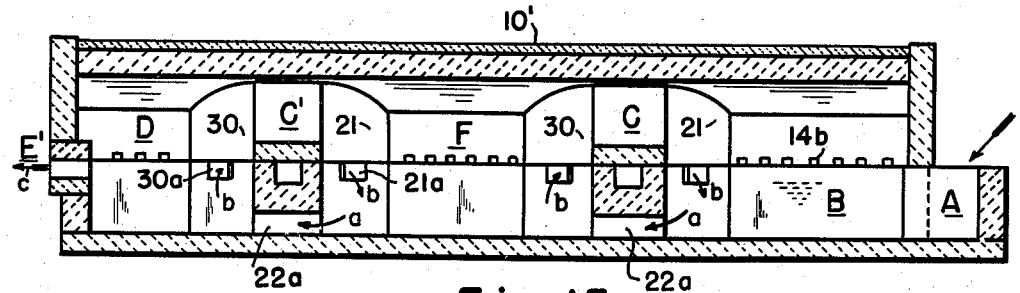
Figure 15 is a side view in elevation on the scale of and taken along the line XV—XV of Figure 14; this figure shows the furnace construction taken longitudinally therethrough.

In the drawings, 10 indicates a refractory furnace construction employing a basic or single unit type of recirculator means, while 10' indicates a so-called multiple type, such as illustrated in Figures 14 and 15 of the drawings.

In providing a furnace suitable for utilizing principles of our invention, we have illustrated a construction, as shown for example in Figures 1 to 9, inclusive, which has a charging well A, a melting furnace chamber or portion B, a dividing or bridge wall or intermediate portion C, a refining or holding portion or chamber D, a delivery duct or passage E, a heating system or duct work arrangement G employing gaseous fluids such as gas and air, and a flue and stack construction H.

The stack H constitutes no part of our invention and may be of any conventional type, but for the purpose of illustration, has been shown as a down-flow, or sub-floor type. Material is charged into the furnace at A, is melted in B, flowing as indicated by the arrows $a$ through a bottom passageway or port 22a (see Figures 4 and 5) in the bridge partition or dividing wall C into the chamber D at a relatively low level to flow or move upwardly through the molten material in refining chamber D towards its surface.

A conditioned portion of the molten material then flows, as indicated by the arrow $c$, through the discharge opening portion 16a of the delivery duct E and to a suitable forming agency, see particularly Figures 1, 6, 7 and 8 of the drawings. At the same time, a portion of the material in the chamber D return-flows in the direction of the arrows $b$, through passageways 30a, 25a, and 21a back into the melting chamber B at a higher or what may be termed a top or surface layer level of the molten material. The flow $b$ is of higher temperature or hotter material, while the flow $a$ is of cooler or minimum temperature material.

In providing a suitable construction to illustrate our invention, we have shown a furnace having refractory back or end wall 11, opposed and longitudinally spaced-apart refractory front or end wall 15, offset refractory well walls 12, and opposed and transversely spaced-apart refractory side walls 14. A charging open portion 13 is provided at the top of the well 12 for feeding-in raw materials into the furnace. A refractory roof or arch wall 17 cooperates with the other walls to enclose the furnace. A refractory floor construction 18 is supported on the frame construction of the furnace.

Figure 4:
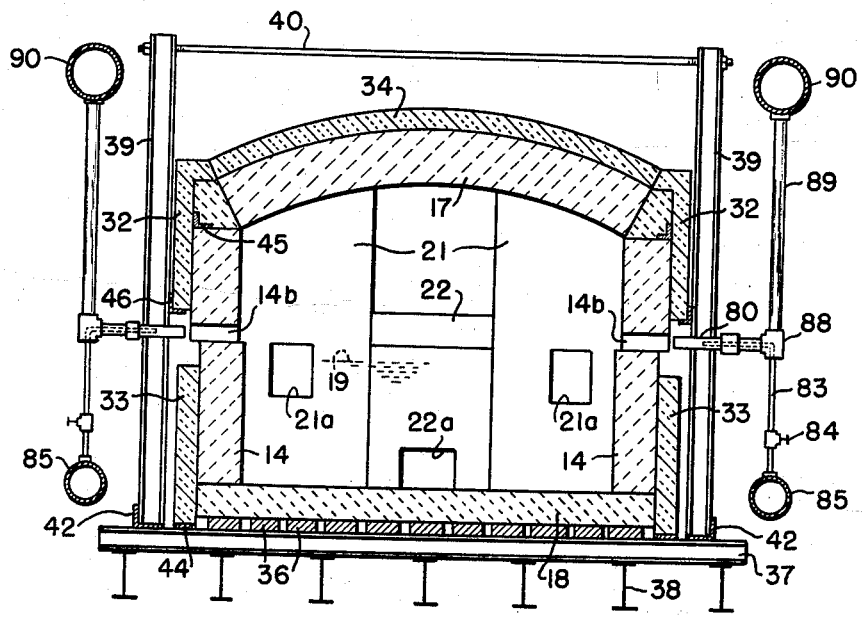
Figure 4 is a transverse section in elevation of enlarged scale taken along the line IV—IV of Figure 1, looking in the direction of the main longitudinal flow of molten material in the furnace.
Figure 5:
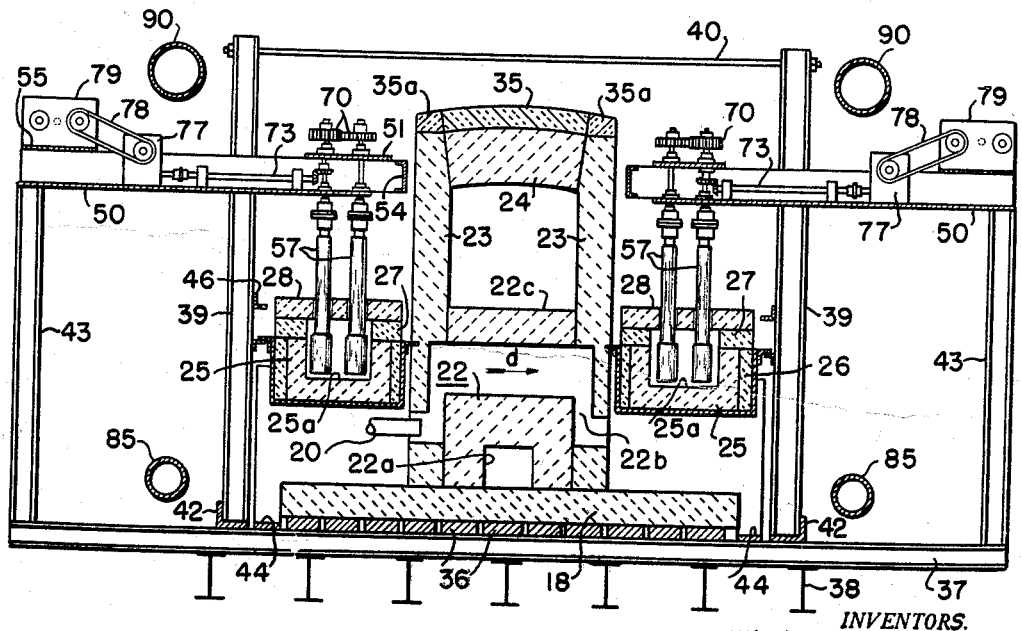
Figure 5 is a section on the scale of Figure 4 taken through a narrow waisted portion of the furnace and its convection means and particularly, along the line V—V of Figure 1.

Referring particularly to Figures 4 and 5 of the drawings, I have provided a bridge dividing or partition wall construction 22 at a sidewise necked-in portion of the furnace which has the longitudinal under-duct 22a for the molten material, and a cross passageway or duct 22b (see particularly Figure 5) which may be supplied with cooling air $d$ by a duct 20. A refractory cap portion 22c cooperates with a pair of upright side refractory portions 23 and a roof refractory portion 24 to define a gas-flow chamber above the working level of the molten material.

As shown particularly in Figures 1 and 4, the level of molten material, indicated as 19, is ordinarily about two inches below burner openings or passages 14b in the side walls 14 and similar burner openings 15b through the front end wall 15. By way of example, the burner holes may be of about 3 inches x 3 inches in size.

On opposite sides and along bridge wall 22 of C, we have provided a pair of return flow duct refractories 25, see particularly Figures 1, 5, 6 and 10. Each refractory 25 has a flow channel or passageway 25a for returning the molten material from refining or holding furnace chamber D to melting furnace chamber B and at a level above the opposite or forward flow through duct 22a. As shown in Figure 5, the side flow passageways are also provided or defined by side spacer and insulating refractories 26, vertical spacer refractories 27, and top or roof closure refractories 28.

It will be noted that the refractories 28 are made in halves to permit stir or back flow aiding elements 57 to be tilted out of position from within the passageway or duct 25a. That is, the roof refractories 28 are made in two halves with half openings to cooperate with each other in a complementary manner to define openings for the elements 57. The elements 57 are rotatably and operatively suspended within the passageways 25a and into the material flowing therealong.

Figure 1:
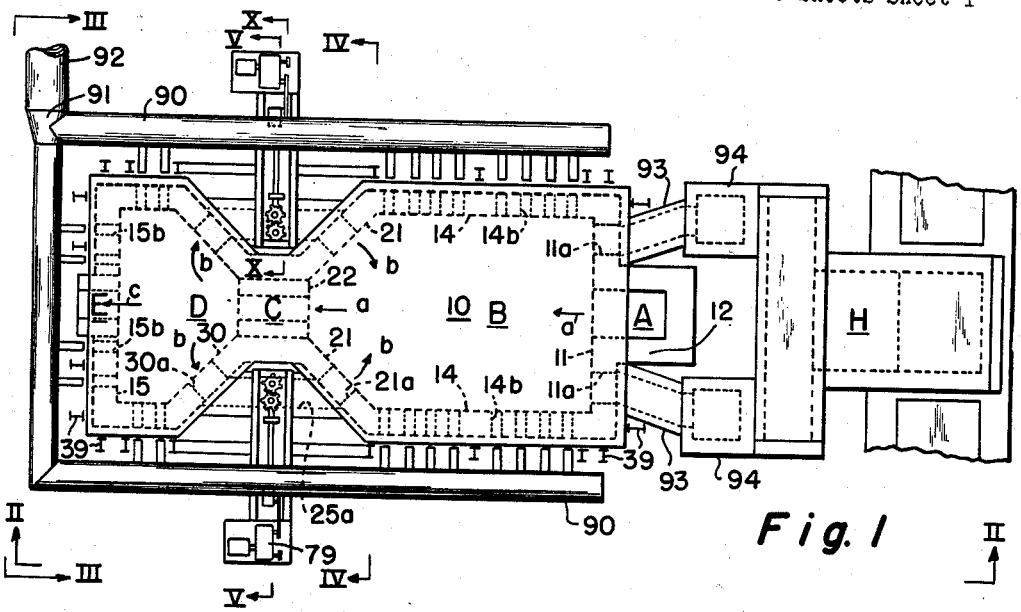
Figure 1 is a plan view of a furnace construction or layout employing principles of our invention.
Figure 6:
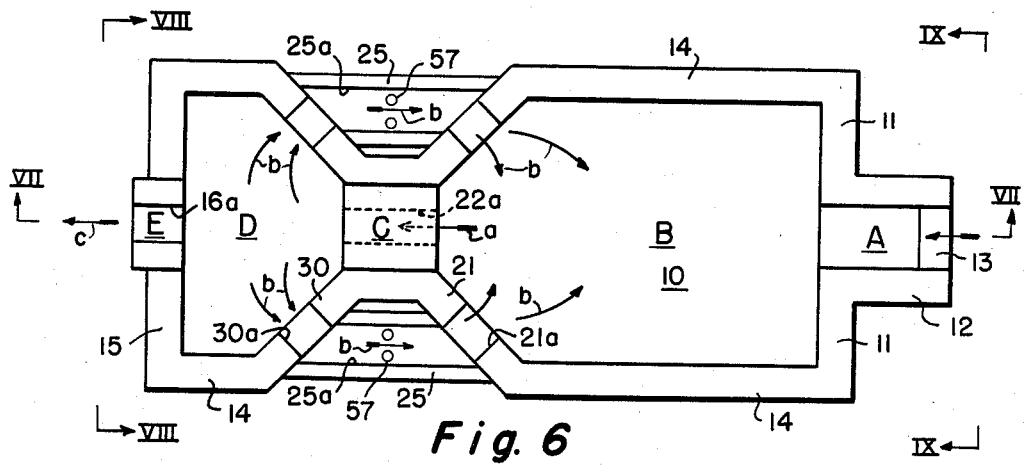
Figure 6 is a top plan view on a reduced scale as to Figures 1, 2 and 3 of the furnace construction of those figures, which is taken along a horizontal split line (without showing roof walls and insulation) to particularly illustrate flow of the molten material between melting portion and a holding or refining portion of the furnace.

The offset shape or necking-in of the furnace at the bridge C is effected by oblique walls 21 on the melting chamber side and opposed oblique walls 30 on the refining chamber side D, see Figures 1 and 6. The walls 21 have openings or passageway portions 21a and the walls 30 have similar portions 30a which are in a cooperatively aligned and open relationship with the passageways 25a to define a continuous passageway on each side of the furnace at an upper level that connects the melting and refining chambers B and D with each other.

As shown particularly in Figure 4, the side walls 14 are provided with upper and lower outer insulation 32 and 33. Also, we have shown roof insulation 34 and supplemental roof insulation 35 and 35a (see Figure 5) at the partition portion C of the furnace. The refractory floor 18 of the furnace is carried by spaced-apart, longitudinally-extending metal spacer members 36 (see Figures 4 and 5). Insulation 33 is carried by metal spacer pieces 44, and insulation 32, by side angle members 46.

The structural framework of metal comprises cross beam floor support members 37 and longitudinal I-beam members 38. Buck stays 39 are mounted in a spaced relationship along the furnace and their bottoms are secured in position to floor members 37 by angle pieces 42. Upper ends of the buckstays 39 are tied together by rods 40. It will be noted that angle inset members 45 extend along the side and roof refractories to strengthen them in their supported relationship.

The structural framework (see Figure 11) also supports a top platform assembly having a bottom plate member 50, top plate members 51 and 55, side channel members 52, and end-connecting and welded-on channel members 54 (see also Figure 10). Bolt and nut assemblies 53 secure the members 50, 51 and 52 into a box-like structure. Side upright beams 43 are secured (see Figure 5) between members 37 and 50.

A pair of stirrers, agitators or mechanical convection-current-producing means 57 which may be termed "paddles," are provided for each return flow passageway 25a. As shown particularly in Figures 5 and 10, we have shown a pair of paddles 57 of similar construction having enlarged submerged lower end portions 57a of some suitable heat-resistant metal such as tungsten. Each paddle 57 has an upper stem portion 57b, and a mounting portion 57c of reduced diameter. Also as shown particularly in Figure 10, a split sleeve collar 58 is adapted to be removably clamped over the portion 57c and to securely hold it in a vertically-suspended operating relationship by means of bolt and nut assemblies 59.

In Figures 5 and 10 to 13, inclusive, we have shown details of the mechanical means for effecting convection through the agency of recirculating currents within the furnace. Such means employs a stirring pair of paddles 57 on each side of the furnace operatively positioned to rotate or turn within one of the side flow channels 25a.

A circular top flange portion 58a (see Figures 10 and 13) is carried by the clamping sleeve 58 and may, as shown particularly in Figure 13, be secured by weld metal $w$ to form a flange part of the clamping sleeve 58 and to securely hold a pair of headed cam pins 58b therein to project upwardly therefrom. A driving collar 60 has a bottom plate or flange portion 60b which serves as a driving plate for the element 57 by the engagement of each of its cam slot edge portions 60c with pins 58b (see also Figure 12). A pair of pins 58b are carried by the flange portion 58a of the clamping member 58. This, in effect, provides a lift-out coupling between positive driving means for the element 57. It effects a quick dismounting of the driven relationship by turning the collar 60 counterclockwise until the head of each pin 58b clears the opening defined by the wider portion of the cam slot 60c.

The drive collar 60 has an internally threaded bore 60a (see Figure 13) to engage male threads of a lower end portion 64a (see Figure 10) of an upper drive shaft 64. A lock collar 61 is internally threaded to be adjusted on 64a and is secured in an adjusted position by pin 62. The shaft 64 is rotatably positioned between plate members 50 and 51 by bearing mounts 65 and 65', by collars 67 and 67', and collar-mounting pins 68 and 68'. Bolts 66 and 66' secure the bearing mounts 65 and 65' on the plate members 50 and 51. The upper end 64b of each shaft 64 is keyed to position and lock a drive gear 70 for rotation therewith.

It will be noted that the drive gears 70 of an adjacent pair of stirring elements 57 are in a meshing relationship with each other so that one may be driven by the other. In Figure 10, the righthand shaft 64 has a beveled pinion 71 feathered or keyed thereto for rotation therewith to mesh with a beveled drive gear 72 that is secured on the end of a horizontal drive shaft 73. Bearing stands 74 are secured by bolts 75 (see Figure 11) to rotatably mount or journal the shaft 73 on the member 50. The shaft 73 is connected through a coupling 76 to a speed reducing unit 77. As shown particularly in Figure 5, the latter is, in turn, connected through a V-belt 78 to a variable pitch drive 79, such as a PIV drive (marketed by the Link-Belt Company). The unit 79 includes an actuating motor such as an electric motor.

We have determined that the stirrers 57 are effective if rotated at a relatively slow speed of, for example about ⅓ to 1 r.p.m. If, by way of example, the temperature of the melting chamber B (above the molten material) in our furnace is kept at about 2700° F., then the refining or holding chamber D (above the molten material) will have a temperature of about 2700° F. or 2700° plus. With a depth of molten material of about 34 inches in our furnace, there will be a temperature differential of about 259° F. between its top and bottom (loss of temperature in depth for flint glass of about 7.6° F. per inch of depth). Thus, there may be about a 259° F. difference between the temperature of the material which is moving along the path a from the chamber B to the chamber D and of the material which is flowing in the opposite direction along the path b from the chamber D to the chamber B.

On the other hand, in a typical old type of furnace construction, the normal temperature in the melting chamber may be about 2750° F. and with a resultant temperature in the refining chamber of about 2200° to 2500° F. (temperatures being measured above the melt in all cases).

The furnace illustrated may be fired with a mixture of gas and air by burner jets introduced along the sides and the front of the furnace. As previously pointed out, side openings 14b and end openings 15b serve as burner openings just above the working level of the molten material in the furnace, see for example Figures 4, 7 and 15 of the drawings.

Figure 3:
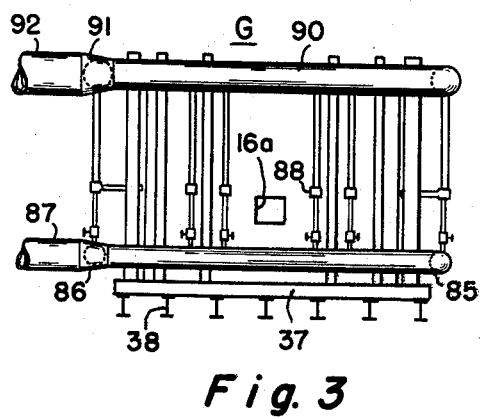
Figure 3 is a front end view in elevation on the scale of Figures 1 and 2 and taken along the line III—III of Figure 1.

Referring particularly to Figure 16, we have shown a burner, mixer and orifice member 80, a pipe member 81 connected thereto by a threaded sleeve 82, and a T 88 connecting the other end of the pipe or conduit member 81 to an air supply pipe 89. Gas is supplied to the mixing chamber of the member 80 from header 85 by the open end 83a of a concentrically-mounted line 83 and is controlled by a conventional valve 84. Gas supply headers or conduits 85 extend along opposite sides of the furnace, including the front end thereof and, as shown in Figure 3, are jointed through a common connector 86 to a source line 87. In a like manner, each air pipe 89 is connected to side and front end mounted supply headers or conduits 90, all of which, as shown in Figure 3, are supplied by a common source 92 through a connector 91.

Figure 2:
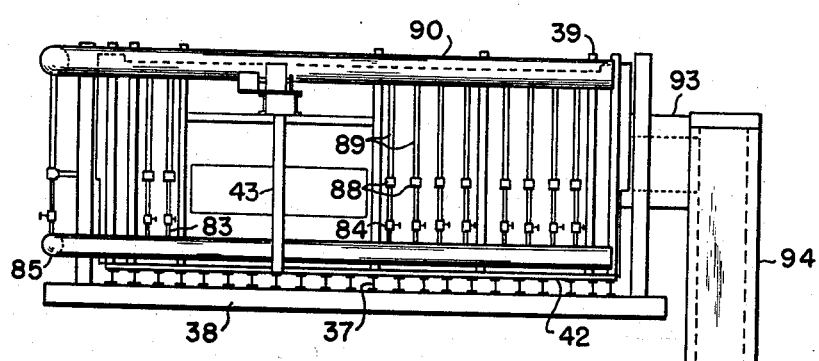
Figure 2 is a side view in elevation on the same scale as Figure 1 and taken in the direction of the line II—II of Figure 1.

As shown in Figures 1 and 2, flue gases leave the rear of the furnace through passageways or open duct portions 11a, flue tunnels 93, and down-stacks 94. It will be apparent that any suitable flue and stack arrangement may be employed and that suitable clean-outs, dampers, etc., are to be used as needed.

Figure 7:
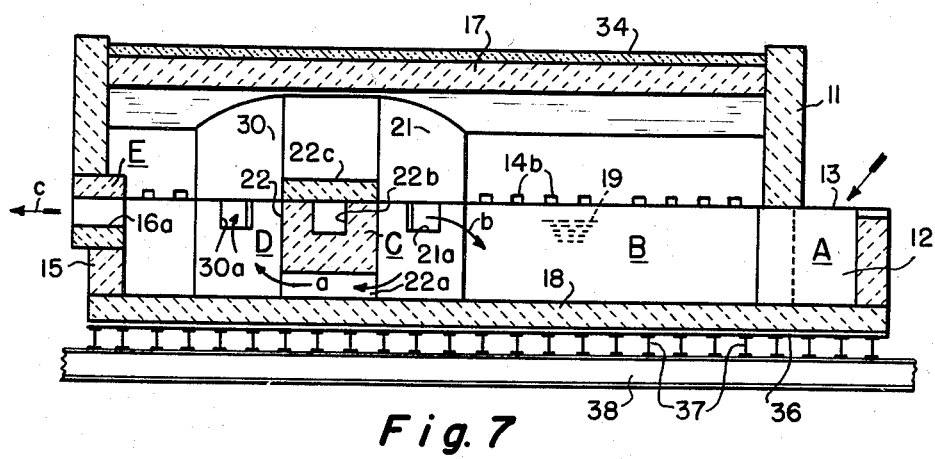
Figure 7 is a longitudinal section in side elevation on the scale of and taken along the line VII—VII of Figure 6.
Figure 8:
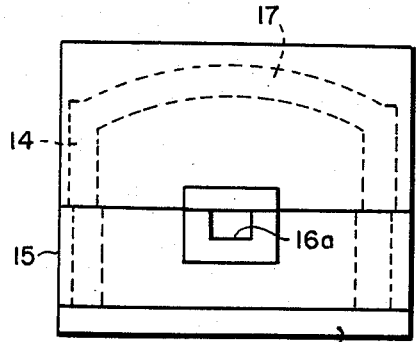
Figures 8 and 9 are front and end views in elevation on the scale of Figures 6 and 7 and respectively taken along the lines VIII—VIII and IX—IX of Figure 6.
Figure 9:
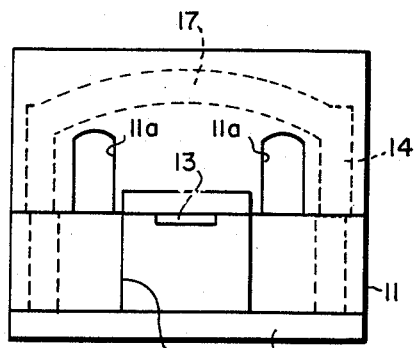

In Figures 14 and 15 of the drawings, we have employed the same general principles of our invention, as in the embodiment of Figures 6 and 7, but have employed them in a multi- or dual type of furnace construction. In this connection, it will be noted that the charge is introduced at the charging well A, is melted in chamber B, then circulates and recirculates through and about the division or partition wall C and within halves of a central chamber F. The chamber F functions somewhat as a refining or holding chamber for the material coming from the refining chamber B and as a melting chamber for material being introduced into the holding or refining chamber D. The molten material is circulated and recirculated in accordance with the principles heretofore outlined between chambers B and F and F and D through division or partition walls C and C'.

It will be apparent to those skilled in the art that the recirculating apparatus or side units may be employed in progression to fulfill the conditioning, heating and refining needs of any particular installation. The pull-out or yield of good or properly conditioned molten material is so much greater employing the two-part or unit recirculator construction of Figures 14 and 15 that two draw-out discharge or delivery ducts or passageways E' are shown in Figure 14.

Summarized briefly, we eliminated floating isles in the batch and excessive temperatures at the breast walls of the partition structure. We attain a surprising uniform blending and conditioning of the materials within the furnace and from the standpoint of the different relative temperatures. Heat transfer is effected by convection currents or diffusion between relatively moving or circulating portions of the molten bath of different levels of the bath in such a manner that the return flow is greater than the effective forward flow for pull-out, shaping or fabrication and is at a different level than the forward flow.

Highly important, the B.t.u. requirements of the furnace have been remarkably reduced for a desired yield or run. There is also produced a much thicker or heavier top blanket of a higher temperature than in an ordinary furnace, for example, as compared with a regenerative or a so-called unit melt furnace. The quality of the glass produced employing the furnace principles of our invention makes possible the effective production of lead or flint glass (contrary to the limitations of a unit melter). Wear and tear on the bridge wall is greatly minimized, in that the bridge wall is given more protection by the hold-back or cooling action produced by utilizing the mechanical recirculating and convection action.

What we claim is:

1. An improved furnace construction for melting, conditioning, and refining material that is to be shaped or formed at a raised temperature which comprises, refractory means defining a melting floor, walls and a roof of the construction; a structural framework supporting said refractory means, opposed inwardly-converging oblique side walls formed intermediate the ends of the furnace, a bridge wall projecting upwardly from said refractory floor between said oblique side walls to a height above the normal depth of molten material within the furnace and being open at its top to provide a flow of heat along the furnace, said bridge wall and said oblique side walls dividing the furnace into a melting chamber and the refining chamber, heating means in both the melting chamber and the refining chamber for heating the material in the furnace substantially along its full extent, a flow duct extending substantially centrally through said bridge wall along said floor for forward movement of molten material from said melting chamber to said refining chamber, a pair of upper level ducts extending through the oblique side walls and spatially disposed from opposite ends of said bridge wall for return flow of molten material from the melting to the refining chamber, an enclosed flow passageway in each of said upper level ducts extending entirely through said oblique walls at a level below the normal level of the material within the furnace, and means operatively positioned within the return flow ducts to recycle the molten material backwardly from the refining to the melting chamber and set up convection current flow in said chambers.

2. An improved furnace construction for melting, conditioning, and refining fusible material such as vitreous material which comprises, a refractory melting floor, side walls, end walls, and roof; each of said side walls having a pair of inwardly-converging oblique wall portions intermediate the end walls forming a necking-in portion, a bridge wall projecting upwardly from said melting floor between the inwardly-converging oblique wall portions of each side wall to a height above the normal depth of molten material within the furnace, said bridge wall terminating in a spatial relationship from said roof to provide a passageway for the flow of heat along the furnace, said bridge wall and said inwardly-converging oblique wall portions dividing the furnace into a melting chamber and a refining chamber, means for heating both the melting and refining chambers, a flow duct extending substantially centrally through said bridge wall along said floor for forward movement of molten material from said melting chamber to said refining chamber, a pair of upper level ducts extending through the oblique wall portions and spatially disposed from opposite ends of said bridge wall for return flow of molten material from the melting to the refining chamber, and means operatively positioned within the upper level ducts to recycle the molten material backwardly from the refining to the melting chamber and set up convection current flow in said chambers.

References Cited in the file of this patent

UNITED STATES PATENTS

| | | |
|---|---|---|
| 1,812,975 | Morton | July 7, 1931 |
| 1,916,668 | Howard | July 4, 1933 |
| 1,959,417 | Flexon | May 22, 1934 |
| 1,973,689 | Geer | Sept. 11, 1934 |
| 1,999,762 | Howard | Apr. 30, 1935 |
| 2,189,271 | Rowe | Feb. 6, 1940 |